US009399429B2

(12) United States Patent
Jolda et al.

(10) Patent No.: US 9,399,429 B2
(45) Date of Patent: Jul. 26, 2016

(54) PREDICTIVE COCKPIT LIGHTING AND PERFORMANCE MODE VIA TOUCH

(71) Applicants: VOLKSWAGEN AG, Wolfsburg (DE); AUDI AG, Ingolstadt (DE)

(72) Inventors: Matthew Jolda, Palo Alto, CA (US); James Leigh Toggweiler, San Francisco, CA (US); Nathaniel Paffett-Lugassy, San Francisco, CA (US)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 139 days.

(21) Appl. No.: 14/295,803

(22) Filed: Jun. 4, 2014

(65) Prior Publication Data

US 2015/0353006 A1 Dec. 10, 2015

(51) Int. Cl.
*B60Q 3/02* (2006.01)
*B60Q 3/04* (2006.01)
*B60K 37/02* (2006.01)
*H05B 37/02* (2006.01)

(52) U.S. Cl.
CPC .............. *B60Q 3/0293* (2013.01); *B60K 37/02* (2013.01); *B60Q 3/0243* (2013.01); *B60Q 3/044* (2013.01); *B60Q 3/048* (2013.01); *H05B 37/0227* (2013.01); *B60K 2350/1024* (2013.01); *B60K 2350/203* (2013.01)

(58) Field of Classification Search
CPC .. B60K 37/06; B60K 2350/928; B60K 35/00; B60K 2350/1024; B60K 2350/1028; B60K 31/0008; B60K 2350/1004; B60K 2350/1052
See application file for complete search history.

(56) References Cited

U.S. PATENT DOCUMENTS

| 9,159,221 B1* | 10/2015 | Stantchev | G08C 17/02 |
| 2003/0023353 A1* | 1/2003 | Badarneh | B60K 35/00 701/1 |
| 2003/0189493 A1* | 10/2003 | Klausner | B62D 15/029 340/575 |
| 2006/0191543 A1* | 8/2006 | Becker | A63F 3/04 128/898 |
| 2006/0284839 A1* | 12/2006 | Breed | B62D 1/046 345/156 |
| 2007/0062753 A1* | 3/2007 | Yoshida | B60K 37/06 180/333 |
| 2011/0018832 A1* | 1/2011 | Pryor | G06F 3/0312 345/173 |
| 2011/0115617 A1* | 5/2011 | Bennett | B60Q 1/50 340/439 |

(Continued)

FOREIGN PATENT DOCUMENTS

| WO | 2005096131 A2 | 10/2005 |
| WO | 2008125640 A1 | 10/2008 |

*Primary Examiner* — Truc M Do
(74) *Attorney, Agent, or Firm* — Barnes & Thornburg LLP

(57) ABSTRACT

An in-vehicle system for controlling electrical systems of a vehicle includes a sensor that detects a presence or an absence of a left hand of a driver on a steering wheel of the vehicle and a sensor that detects a presence or an absence of a right hand of the driver on the steering wheel of the vehicle. Using data from the sensors, a controller may select, based on a prediction, one or more interactive control elements with which the driver will interact, wherein the selection is based on either a detected absence of the driver left hand on the steering wheel or a detected absence of the driver right hand on the steering wheel, and a controller increases a brightness of lighting elements associated with the selected interactive control elements.

25 Claims, 5 Drawing Sheets

(56) References Cited

U.S. PATENT DOCUMENTS

| | | | | |
|---|---|---|---|---|
| 2011/0245643 A1* | 10/2011 | Lisseman | ................ | A61B 5/01 600/372 |
| 2011/0257846 A1* | 10/2011 | Bennett | ................ | B60K 28/02 701/45 |
| 2011/0292667 A1* | 12/2011 | Meyers | ................ | B60Q 1/38 362/465 |
| 2012/0179328 A1 | 7/2012 | Goldman-Shenhar | | |
| 2012/0326735 A1* | 12/2012 | Bennett | ................ | B62D 1/06 324/705 |
| 2013/0050114 A1* | 2/2013 | Backman | ............... | B60K 37/06 345/173 |
| 2013/0076499 A1* | 3/2013 | Okita | ................ | B60K 35/00 340/438 |
| 2013/0076615 A1* | 3/2013 | Iao | ................ | G06F 3/017 345/156 |
| 2014/0081521 A1* | 3/2014 | Frojdh | ................ | G06F 3/017 701/36 |
| 2014/0121903 A1* | 5/2014 | Lee | ................ | B60K 35/00 701/41 |
| 2014/0156107 A1* | 6/2014 | Karasawa | .......... | G01C 21/3664 701/1 |
| 2014/0168061 A1* | 6/2014 | Kim | ................ | G06F 3/017 345/156 |
| 2014/0292665 A1* | 10/2014 | Lathrop | ................ | G06F 3/013 345/173 |
| 2014/0292692 A1* | 10/2014 | Okuyama | ............. | B62D 1/046 345/173 |
| 2014/0365076 A1* | 12/2014 | Cash | ................ | B62D 1/02 701/41 |

\* cited by examiner

PREDICTIVE COCKPIT LIGHTING AND PERFORMANCE MODE VIA TOUCH

BACKGROUND

The present disclosure relates to systems, components, and methodologies for controlling electrical systems of a vehicle. In particular, the present disclosure is directed to systems, components, and methodologies that make more visible to the driver interactive control elements with which the driver is likely to interact.

Electrical systems accessible to drivers and passengers in vehicle cockpits have become increasingly complex. A driver in a modern vehicle cockpit may be able to control numerous electrical systems, including electrical systems for climate control, for controlling windows, for obtaining information and entertainment (i.e., "infotainment"), for navigation, and for mobile communication, to name a few. These electrical systems provide useful features for drivers and passengers and make the driving experience more enjoyable and efficient.

SUMMARY

According to the present disclosure, systems, components, and methodologies are provided for controlling electrical systems of a vehicle to predict the interactive control elements with which a driver is likely to interact and to make those interactive control elements more visible to the driver.

Disclosed embodiments address the above-described technical problems by providing a sensor that detects a presence or an absence of a left hand of a driver on a steering wheel of the vehicle; providing a sensor that detects a presence or an absence of a right hand of the driver on the steering wheel of the vehicle; and predicting one or more interactive control elements with which the driver will interact based upon a detection that either the driver's left hand or the driver's right hand is absent from the steering wheel. Disclosed embodiments further provide a controller that increases the brightness of lighting elements associated with the interactive control elements with which the driver is predicted to interact.

In illustrative embodiments, the systems, components, and methodologies comprise a controller having a processor and a memory, a sensor system in communication with the controller, various electrical systems having interactive control elements with which a driver may interact, and lighting elements in communication with the controller and associated with respective interactive control elements.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which.

DETAILED DESCRIPTION

Figure 1:
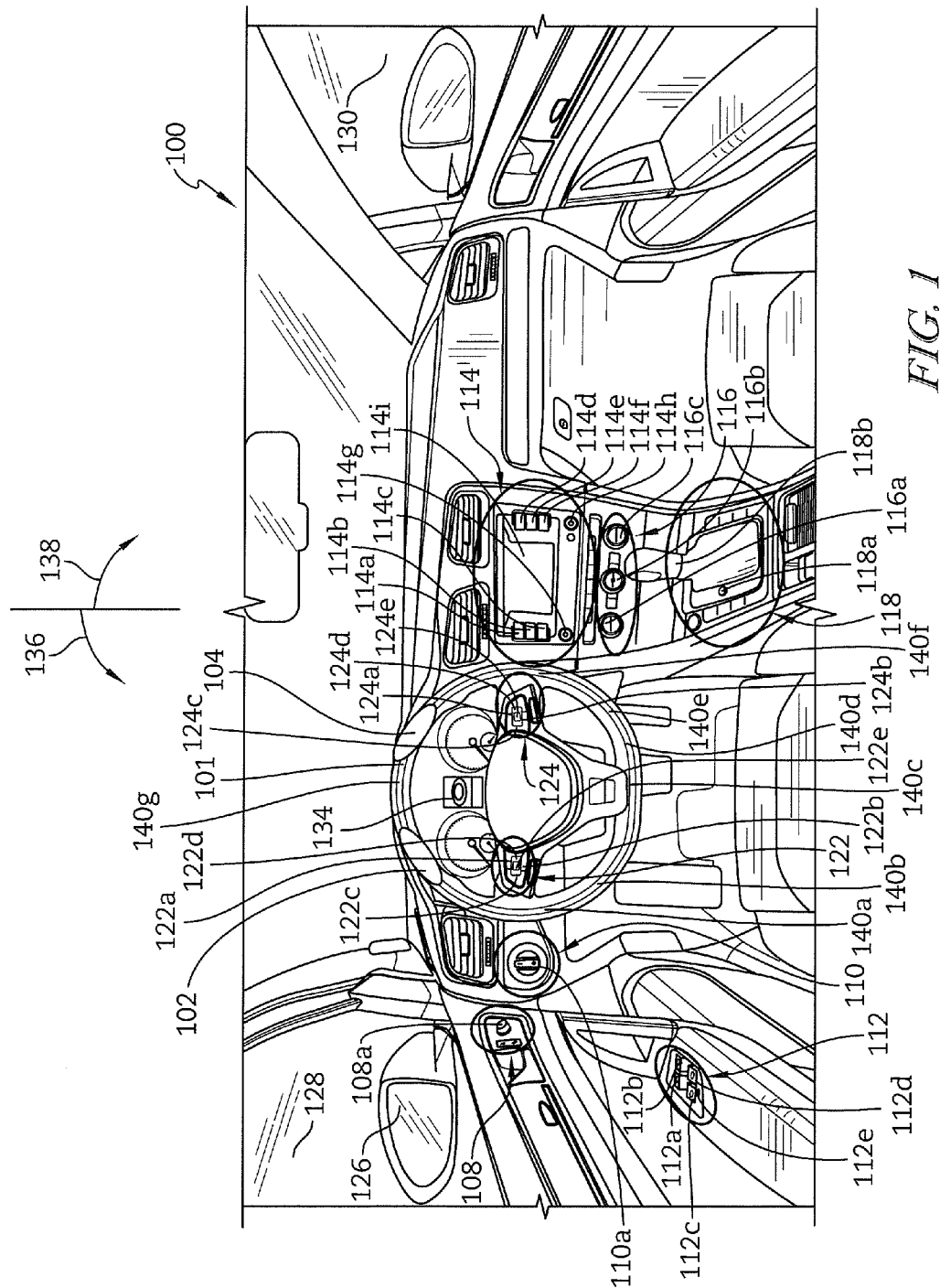
FIG. 1 shows an exemplary vehicle cockpit with a steering wheel, steering wheel sensors, and interactive control elements associated with a number of electrical systems.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Systems, components, and methodologies disclosed herein provide an in-vehicle system that predicts the interactive control elements with which a driver is likely to interact and increases the brightness of lighting elements associated with those interactive control elements. This makes it easier for the driver to find interactive control elements of interest and minimizes distraction to the driver. Disclosed embodiments include sensors located on the vehicle's steering wheel, including a left steering wheel sensor located where the driver's left hand is ordinarily placed and a right steering wheel sensor located where the driver's right hand is ordinarily placed. When the right steering wheel sensor detects that the driver's right hand has been removed from the steering wheel, the in-vehicle system predicts that the driver may reach for interactive control elements located on the right side of the driver. In response, the in-vehicle system increases the brightness of lighting elements associated with the interactive control elements on the driver's right side. Similarly, when the left steering wheel sensor detects that the driver's left hand has been removed from the steering wheel, the in-vehicle system predicts that the driver may reach for interactive control elements located on the left side of the driver. In response, the in-vehicle system increases the brightness of lighting elements associated with interactive control elements on the left side.

Thus, according to the present disclosure, the absence of touch on the steering wheel triggers the in-vehicle system to predict and respond to the driver's intentions. This is in contrast to alternative solutions, which would be more complex, technologically cumbersome, and costly. For example, certain alternatives may determine a driver's intent by providing sensors on a steering wheel on which the driver can provide gestures using a finger. Gesture-recognition technologies, however, may require costly, high resolution, and high sensitivity sensors capable of discerning subtle hand or finger movements. They also may require complex software capable of distinguishing and translating gestures. Other systems may determine a driver's intent by tracking the eye gaze of the driver. However, eye-tracking systems may require costly hardware and complex software. Still other implementations may determine a driver's intent though proximity detectors. Such proximity detectors may also require expensive hardware and complex software.

By determining a driver's intentions using the absence of a hand on the steering wheel, the disclosed embodiments can be implemented with inexpensive, relatively low resolution, and relatively low sensitivity sensors. Moreover, embodiments according to the present disclosure can be implemented with relatively simple software running on relatively low cost processors, as a driver's intentions may be predicted using a simple binary decision process of determining whether a hand is present or absent from a steering wheel.

More particularly, FIG. 1 shows an exemplary vehicle cockpit 100 with a steering wheel 101, a left steering wheel sensor 102, a right steering wheel sensor 104, and electrical systems 108, 110, 112, 114, 116, and 118. In this exemplary illustration, the electrical systems 108, 110, 112, 114, 116, and 118 include: a side mirror adjustment system 108, a headlight control system 110, a window control system 112, an information and entertainment ("infotainment") system 114, a climate control system 116, and a gear and power train adjustment system 118.

The depicted electrical systems are exemplary, and other electrical systems suitable for use in a vehicle are within the scope of the present disclosure. Examples of other electrical systems include rear view mirror controls, sun or moon roof controls, vent controls, door lock and handle controls, and others.

Each of the electrical systems 108, 110, 112, 114, 116, and 118 includes interactive control elements. For example, the side mirror adjustment system 108 includes an interactive control element in the form of a joystick 108a. A driver may adjust the horizontal and vertical tilt of a side mirror 126 using the joystick 108a. Similarly, the headlight control system 110 includes an interactive control element in the form of a dial 110a that the driver can rotate to turn the vehicle's headlights on or off and/or to adjust the brightness of the vehicle's headlights.

The window control system 112 includes interactive control elements in the form of four switches 112a-d and a push button 112e. The switch 112a allows a driver to lower the driver-side window 128 by pressing down on the switch 112a and allows the driver to raise the driver-side window 128 by pulling up on the switch 112a. Through similar mechanisms, the switch 112b allows the driver to raise or lower the passenger-side window 130, and the switches 112c and 112d allow the driver to raise or lower respective left side and right passenger windows at the rear of the vehicle (not shown). The push button 112e allows a driver to lock passenger windows from being raised or lowered.

The infotainment system 114 includes interactive control elements in the form of push buttons 114a-f and knobs 114g-h. The infotainment system includes a display screen 114i that provides an interface by which a driver can control informational and entertainment features of the vehicle, including audio sound through a compact disc player, portable music player, smartphone, terrestrial radio, or satellite radio; maps and navigation; telephone communications; and other features. The push buttons 114a-f and knobs 114g-h are generally used by a driver to traverse through on-screen menus on display screen 114i, to make selections presented by the display screen 114i, and to choose settings related to the vehicle's informational and entertainment features.

The climate control system 116 includes dial-and-button assemblies 116a-c, each of which includes a rotatable dial that circumferentially surrounds push buttons. The dials and push buttons of the dial-and-button assemblies 116a-c can be used by the driver to adjust various aspects of the climate control system 116, including temperature, air pressure, settings for respective climate zones within the vehicle, and the like.

The gear and power train adjustment system 118 includes interactive control elements in the form of a button 118a and a gear shifter 118b. The button 118a can be used by the driver to adjust power train settings such as whether the vehicle operates in an overdrive mode, and the gear shifter 118b can be used by the driver to change the gear in which the vehicle operates (e.g., drive, neutral, reverse, etc.).

Also shown in FIG. 1 are electrical systems having interactive control elements located on the steering wheel 101. Specifically, in this illustrative embodiment, the steering wheel 101 includes an audio control system 122 and a multifunction display control system 124. The audio control system 122 is used to adjust settings of the audio emitted by speakers of the vehicle related to audio entertainment, navigation, and/or telephone functionality. The audio control system 122 includes interactive control elements in the form of a volume-up push button 122a, a volume-down push button 122b, radio frequency scanning push buttons 122c and 122d, and a push button 122e for initiating or ending telephone calls.

The multifunction display control system 124 includes push buttons that allow a driver to control the display of the multifunction display 134. The multifunction display 134 generally displays information regarding the vehicle's speed, fuel efficiency, amount of fuel remaining, distance traveled by the vehicle, and other parameters of interest regarding the vehicle's travel. The multifunction display control system 124 includes interactive control elements in the form of push buttons 124a-d that form a directional pad by which the driver can navigate through displays presented to the driver on the multifunction display 134, and a selection button 124e by which the driver can select on-screen options.

The description of electrical systems and associated interactive control elements set forth above is exemplary only, and is not exhaustive of the electrical systems and associated interactive control elements depicted in the vehicle cockpit 100. Nor is the description above exhaustive of the electrical systems and associated interactive control elements contemplated within the scope of the invention. Generally, any electrical system and associated interactive control elements suitable for use in a vehicle cockpit will be within the scope of the present disclosure.

As previously mentioned, FIG. 1 shows a left steering wheel sensor 102 and a right steering wheel sensor 104. The left steering wheel sensor 102 is placed at a location on the steering wheel 101 where a driver's left hand would ordinarily be placed during normal driving conditions. Similarly, the right steering wheel sensor 104 is placed at a location on the steering wheel 101 where a driver's right hand would ordinarily be placed during normal driving conditions.

The left and right steering wheel sensors 102 and 104 are electrically connected to a controller 304. In accordance with the present disclosure, the controller 304 may be located behind the multifunction display 134, and thus is not visible to a driver and obstructed from the depiction of the cockpit 100 in FIG. 1. The controller 304 is depicted in the block diagram of FIG. 3, to be discussed in more detail below.

The left steering wheel sensor 102 and the right steering wheel sensor 104 are configured to be able to detect the presence or absence of a hand. In operation during normal driving conditions, the left steering wheel sensor 102 and the right steering wheel sensor 104 will detect the presence of the driver's left and right hands, respectively. If the driver removes a left hand from the steering wheel 101, the left steering wheel sensor 102 will detect an absence of the driver's left hand. Likewise, if the driver removes a right hand from the steering wheel 101, the right steering wheel sensor 104 will detect an absence of the driver's right hand.

The left and right steering wheel sensors 102 and 104 can be implemented by a variety of sensor technologies. In certain embodiments, the left and right steering wheel sensors 102 and 104 are pressure sensors. Thus, the left and right hand of the driver apply pressure to the steering wheel 101 at locations at or near the left and right steering wheel sensors 102 and 104, respectively. The pressure applied by the driver's left and right hands causes deformations on the surface of the steering wheel 101, and the left and right steering wheel sensors 102 and 104 convert the deformations into electrical signals reflecting either the presence or absence of the driver's hands. In certain embodiments, the left and right steering wheel sensors 102 and 104 may be resistive pressure sensors. In other embodiments, the left and right steering wheel sensors 102 and 104 may be capacitive pressure sensors. In still other embodiments, the left and right steering wheel sensors 102 and 104 may be inductive pressure sensors.

In alternative embodiments, the left and right steering wheel sensors 102 and 104 may be thermal sensors. In such embodiments, the left and right steering wheel sensors 102 and 104 detect heat from the driver's left and right hands, respectively. Exemplary implementations of thermal sensors include bolometers, thermocouples, and pyroelectric sensors.

In certain embodiments, the left steering wheel sensor 102 and the right steering wheel sensor 104 are separate, discrete, and stand-alone sensor components. In other embodiments, the left steering wheel sensor 102 and the right steering wheel sensor 104 are merely different locations or zones on a common touch-sensitive sensor surface.

As explained, it is not necessary that the left and right steering wheel sensors 102 and 104 be particularly sensitive or have particularly high resolution. Generally, any sensor capable of detecting the presence or absence of a hand will suffice, and this provides the advantage of allowing for implementations with low cost sensors. In certain embodiments, sensors capable of detecting pressure differentials of about 5 grams of force will suffice. In certain embodiments, sensors having a spatial resolution of longer than about one inch will suffice.

Generally, any type of sensor known in the art and capable of detecting the presence or absence of a hand of a driver on a steering wheel is within the scope of the present disclosure.

Figure 2:
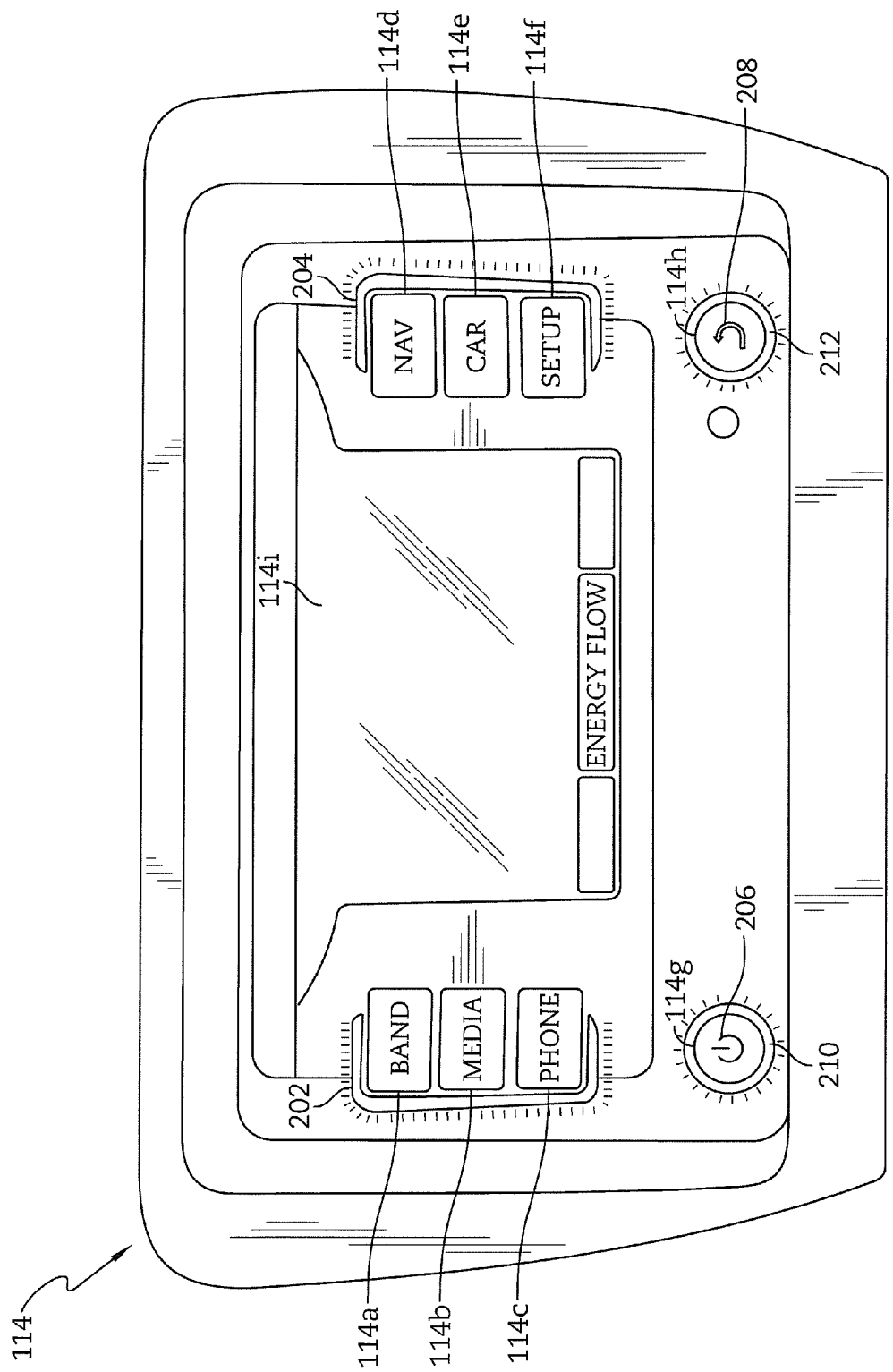
FIG. 2 shows exemplary configurations of lighting elements associated with interactive control elements in accordance with the disclosure.

The vehicle cockpit 100 also includes lighting elements associated with the interactive control elements. Lighting elements associated with the interactive control elements depicted in FIG. 1 are not separately identified in FIG. 1 for clarity. However, FIG. 2 shows a close-up view of the infotainment system 114, including illustrative lighting elements associated with the interactive control elements 114a-h.

As explained, interactive control elements associated with infotainment system 114 include the push buttons 114a-f and the knobs 114g-h. The push buttons 114a-f may include translucent text descriptive of the function of that button, such that the text ordinarily appears white but may be illuminated for greater visibility. Thus, push button 114a has a lighting element in the form of translucent, illuminable text "BAND", push button 114b has a lighting element in the form of translucent, illuminable text "MEDIA", push button 114c has a lighting element in the form of translucent, illuminable text "PHONE", push button 114d has a lighting element in the form of translucent, illuminable text "NAV", push button 114e has a lighting element in the form of translucent, illuminable text "CAR", and push button 114f has a lighting element in the form of translucent, illuminable text "SETUP".

The push buttons 114a-f may also have lighting elements that delineate the boundary of each of the push buttons 114a-f to enhance visibility of the buttons 114a-f. Thus, the infotainment system 114 may include an illuminable lighting element 202 that outlines the boundaries of push buttons 114a-c and an illuminable lighting element 204 that outlines the boundaries of push buttons 114d-f. In the depicted embodiment, the illuminable lighting elements 202 and 204 are tubular lighting elements that trace the contours of the push buttons 114a-c and 114d-f, respectively. In other embodiments, the illuminable lighting elements 202 and 204 are not visible to the driver, but rather emanate light from behind the infotainment system 114 into crevices disposed between and around the push buttons 114a-c and the push buttons 114d-f.

Similarly, the knobs 114g and 114h may have associated lighting elements. In the embodiment depicted in FIG. 2, the knobs 114g and 114h include translucent, illuminable symbols indicative of their respective functions, such that the symbols ordinarily appear white but may be illuminated for greater visibility. Here, the knob 114g includes a translucent, illuminable power-on/power-off symbol 206. Likewise, the knob 114h includes a translucent, illuminable return-to-previous-screen symbol 208.

The knobs 114g and 114h may also have lighting elements surrounding the knobs 114g and 114h to enhance visibility of the knobs 114g and 114h. Thus, a tubular lighting element 210 surrounds the knob 114g and a tubular lighting element 212 surrounds the knob 114h. In other embodiments, lighting elements not visible to the driver emanate light into crevices surrounding the knobs 114g and 114h.

A variety of mechanisms may be used for providing the light source for the above-described lighting elements. In certain implementations, each lighting element includes a standalone light emitting diode ("LED"). Thus, for example, an LED (not shown) may be disposed behind the translucent, illuminable text "BAND" on push button 114a such that when powered, the LED illuminates the text "BAND". Similarly, there may be an LED (not shown) disposed behind the knob 114g that, when powered, illuminates the illuminable power-on/power-off symbol 206.

In other embodiments, the lighting for multiple interactive control elements may be provided by a single light source. For example, a single LED or a panel of LED's (not shown) may be disposed generally behind the push buttons 114a-c, with that single LED or panel of LED's illuminating all four of the illuminable text "BAND", the illuminable text "MEDIA", the illuminable text "PHONE", and the tubular lighting element 202.

The LEDs that provide light to the above-described lighting elements may be variable intensity LEDs that provide additional brightness and consume additional power upon receipt of higher voltage inputs and that provide lower brightness and consume less power upon receipt of lower voltage inputs. Alternatively, the LEDs may have a digital interface such that their brightness and power consumption may be governed by digital signals indicating whether the LED should be operating at full power/brightness, 50% power/brightness, or at some other level.

Mechanisms for illuminating interactive control elements within vehicle cockpits are generally known in the art. Generally, any suitable mechanism for providing lighting that aids in the visibility of interactive control elements within vehicle cockpits is within the scope of the present disclosure.

The above disclosure of lighting elements was with reference to the infotainment system 114, but it should be understood that similar lighting features may be provided with the other electrical systems 108, 110, 112, 116, 118, 122, and 124.

Figure 3:
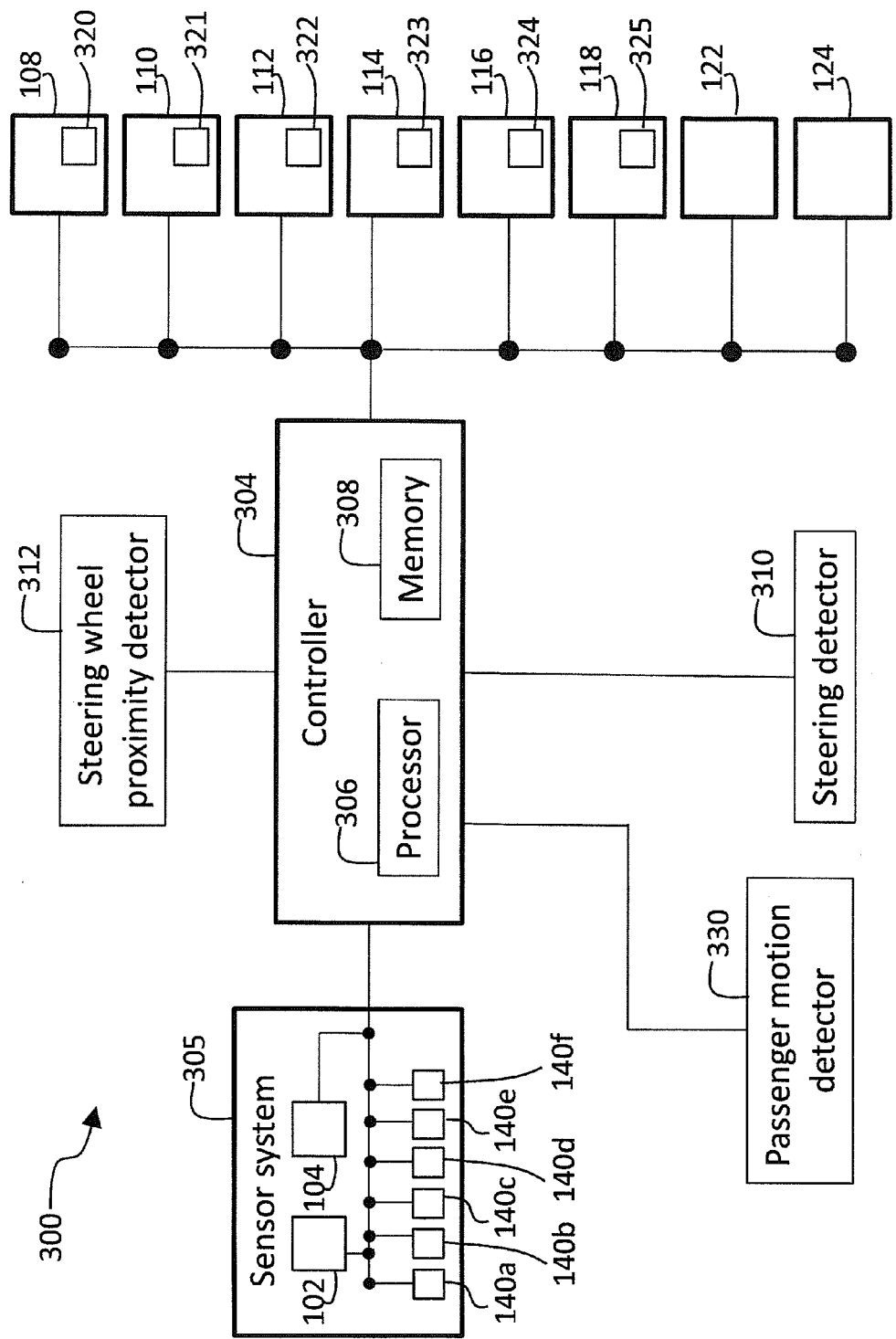
FIG. 3 is a block diagram showing the components of an exemplary system in accordance with the disclosure.

FIG. 3 is a block diagram showing the components of an exemplary in-vehicle system 300 in accordance with the disclosure. The in-vehicle system 300 includes the controller 304 having a processor 306 and a memory 308. The in-vehicle system 300 also includes a sensor system 305 that includes the previously described left steering wheel sensor 102 and the right steering wheel sensor 104. The in-vehicle system 300 also includes the previously described electrical systems 108, 110, 112, 114, 116, 118, 122, and 124. Also shown in FIG. 3 is a steering wheel proximity detector 312, a steering detector 310, and a passenger motion detector 330, all of which will be described in more detail below.

The controller 304 is electrically connected to the sensor system 305, the electrical systems 108, 110, 112, 114, 116, 118, 122, and 124, the steering wheel proximity detector 312, the steering detector 310, and the passenger motion detector 330. The electrical connections can be made using any mechanism known in the art, such as a communications bus.

In operation, the in-vehicle system 300 is initialized with lighting elements in the vehicle cockpit 100 in either an off state or in a dimmed state. Whether the lighting elements are initialized in an off state or a dimmed state may be selected by driver preference. The driver may desire the lighting elements to be in an off state because the driver prefers full darkness in the cabin 100 while driving, similar to "night flying" modes available in jets. Alternatively, the driver may desire the lighting elements to be in a dimmed state so that the driver has some visibility of interactive control elements. If the lighting elements are initialized in a dimmed state, the brightness of the lighting elements may be based on driver preference. For example, the driver may make a selection on a preferred initialization brightness for lighting elements using the infotainment system 114.

In certain embodiments, initialization of the in-vehicle system 300 occurs when the driver affirmatively selects to initialize the in-vehicle system 300—e.g., by making a selection using the infotainment system 114. In other embodiments, the in-vehicle system 300 is initialized during night time driving conditions. In such embodiments, the vehicle will include a daylight sensor (not shown) that determines whether the driver is operating the vehicle during daytime or nighttime conditions, and the vehicle will initialize the in-vehicle system 300 upon a detection that nighttime conditions persist. In still other embodiments, the in-vehicle system is initialized immediately upon vehicle startup, without regard to whether daytime or nighttime conditions persist.

After initialization, the sensor system 305 communicates to the controller 304, providing information to the controller 304 regarding the presence or absence of the left hand and right hand of the driver on the steering wheel 101. As explained, the left steering wheel sensor 102 and the right steering wheel sensor 104 each transmit electrical outputs that indicate whether the driver's left hand and right hand, respectively, are present on the steering wheel 101. When the driver's left hand is removed from the steering wheel 101, the left steering wheel sensor 102 detects the absence of the driver's left hand and transmits an electrical signal indicating an absence of the driver's left hand. Similarly, when the driver's right hand is removed from the steering wheel 101, the right steering wheel sensor 104 detects the absence of the driver's right hand and transmits an electrical signal indicative of the absence of the driver's right hand. The signals from the left and right steering wheel sensors 102 and 104 are electrically transmitted to the controller 304. As a result, the controller 304 receives notifications when the left and right steering wheel sensors 102 and 104 detect an absence of the driver's left or right hands, respectively.

Upon detecting that the driver's left hand is absent from the steering wheel 101, the controller 304 predicts that the driver is using his or her left hand to reach for interactive control elements associated with electrical systems to the left of the driver. Thus, the controller 304 transmits signals to lighting elements to the left of the driver causing the lighting elements to increase in brightness. If these lighting elements were initialized in an off state, they will turn on and emanate light at a predetermined brightness. The predetermined brightness may be a setting of the in-vehicle system 300 or may be based on a selection made by the driver. If these lighting elements were initialized in a dimmed state, they will continue emanating light, but with increased brightness. The level of increased brightness may be a setting of the in-vehicle system 300 or may be based on a selection made by the driver.

In the illustrative embodiment of the present disclosure, the electrical systems to the left of the driver include the side mirror adjustment system 108, the headlight control system 110, and the window control system 112. Thus, when the controller 304 receives a signal indicating that the driver's left hand is absent from the steering wheel 101, the controller 304 will predict that the driver may reach for one or more of interactive control element 108a, interactive control element 110a, and interactive control elements 112a-e. The controller 304 transmits an electrical signal to the lighting elements associated with the interactive control elements 108a, 110a, and 112a-e, that causes their brightness to increase.

Figure 4:
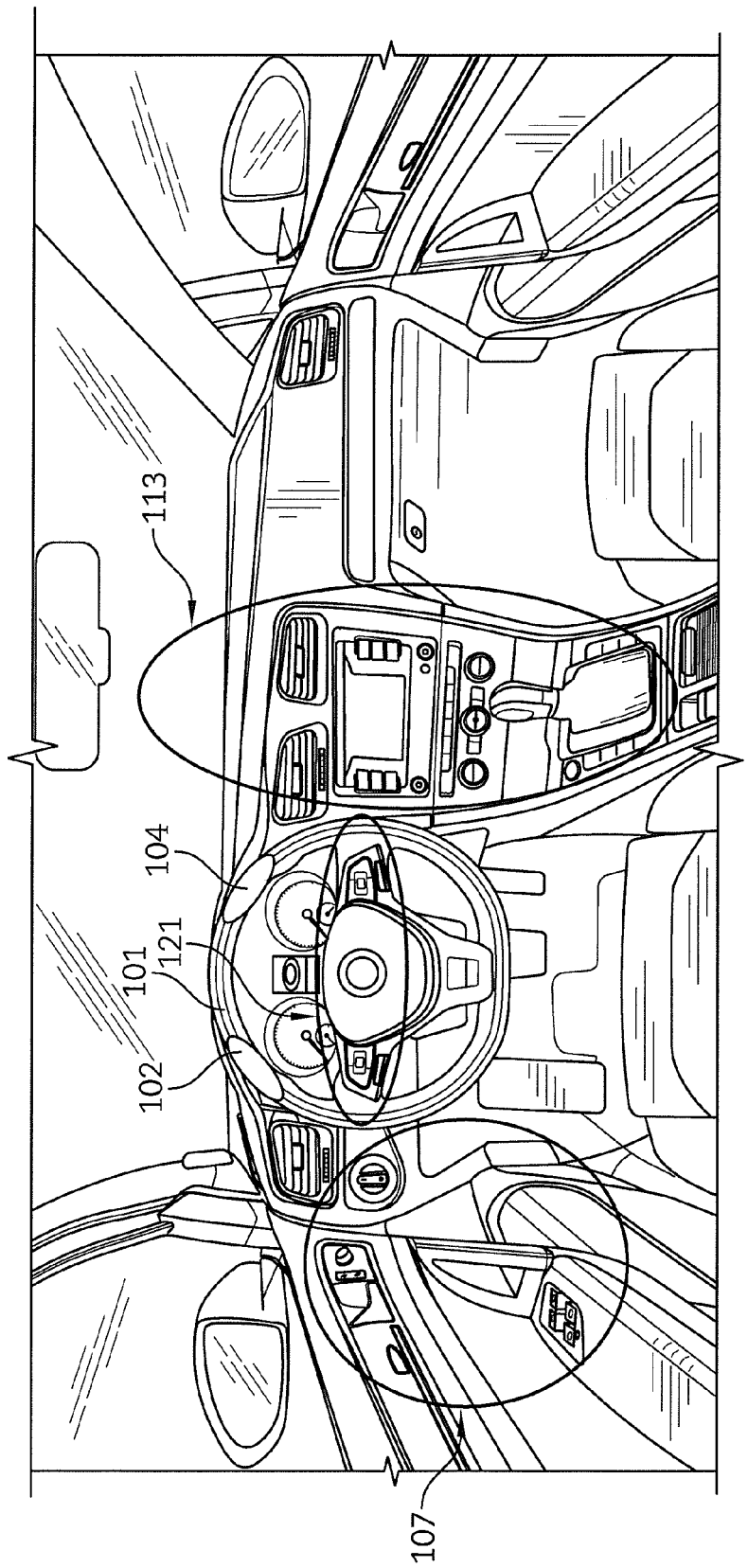
FIG. 4 shows the exemplary vehicle cockpit of FIG. 1, and illustrates a left-side zone of interactive control elements, a right-side zone of interactive control elements, and a steering wheel zone of interactive control elements in accordance with the disclosure.

FIG. 4 shows the vehicle cockpit 100 depicted in FIG. 1, and highlights a left-side zone 107 that includes the electrical systems 108, 110, and 112. Thus, by way of summary, lighting elements within the left-side zone 107 increase in brightness when the controller 304 receives an indication that the driver's left hand is absent from the steering wheel 101.

Returning to FIG. 3, upon detecting that the driver's right hand is absent from the steering wheel 101, the controller 304 predicts that the driver is using his or her right hand to reach for interactive control elements associated with electrical systems to the right of the driver. Thus, the controller transmits signals to lighting elements to the right of the driver causing the lighting elements to increase in brightness. If these lighting elements were initialized in an off state, they will turn on and emanate light at a predetermined brightness. The predetermined brightness may be a setting of the in-vehicle system 300 or may be based on a selection made by the driver. If these lighting elements were initialized in a dimmed state, they will continue emanating light, but with increased brightness. The level of increased brightness may be a setting of the in-vehicle system 300 or may be based on a selection made by the driver In this illustrative embodiment, the electrical systems to the right of the driver include the infotainment system 114, the climate control system 116, and the gear and power train adjustment system 118. Thus, when the controller 304 receives a signal indicating that the driver's right hand is absent from the steering wheel 101, the controller 304 predicts that the driver may reach for one or more of the interactive control elements 114a-h, the interactive control elements 116a-c, and the interactive control elements 118a-b. The controller 304 transmits an electrical signal to the lighting elements associated with the interactive control elements 114a-h, 116a-c, and 118a-b, that causes their brightness to increase.

Returning again to FIG. 4, a right-side zone 113 includes the lighting elements that increase in brightness when the controller 304 receives an indication that the driver's right hand is absent from the steering wheel 101.

When a particular hand is absent from the steering wheel 101, the corresponding left or right steering wheel sensor 102 or 104 will continue to detect a presence or an absence of the hand from the steering wheel 101. When the hand returns to the steering wheel 101, the corresponding left or right steering wheel sensor 102 or 104 will detect its presence and communicate that presence to the controller 304. The controller 304 will then cause the brightened lighting elements within the vehicle cockpit to return to their initialized state (e.g., off or dimmed).

Distinguishing interactive control elements in a left-side zone 107 from interactive control elements in a right-side zone 113 is advantageous because a driver usually does not cross his or her right arm over to interact with interactive control elements within the left-side zone 107, and usually does not cross his or her left arm over to interact with interactive control elements within the right-side zone 113. However, other implementations are within the scope of the disclosure. For example, certain embodiments may contemplate that a driver will use his or her right hand to control interactive control elements in either the left-side zone 107 or the right-side zone 113. Thus, lighting elements within both the left-side zone 107 and the right-side zone 113 will increase in brightness upon a detection that the driver's right hand is absent from the steering wheel 101.

In still other embodiments, the controller 304 may not distinguish one hand from another. Thus, lighting elements within both the left-side zone 107 and the right-side zone 113 may increase in brightness upon a detection that either the driver's left hand or the driver's right hand is absent from the steering wheel 101.

As previously explained, the steering wheel 101 includes steering wheel audio control system 122 on the left side of the steering wheel 101 and a multifunction display control system 124 on the right side of the steering wheel 101. In certain embodiments (not shown in the Figures), the steering wheel audio control system 122 is included in the left-side zone 107, such that lighting elements associated with interactive control elements 122a-e increase in brightness when the driver's left hand is absent from the steering wheel 101. Similarly, in certain embodiments (not shown in the Figures), the multifunction display control system 124 is included in the right-side zone 113, such that lighting elements associated with interactive control elements 124a-e increase in brightness when the driver's right hand is absent from the steering wheel 101. In still other embodiments, all interactive control elements on the steering wheel 101, including the interactive control elements 122a-e and the interactive control elements 124a-e, are considered part of both the left-side zone 107 and the right-side zone 113, such that all lighting elements on the steering wheel 101 increase in brightness anytime either the driver's left hand or the driver's right hand is absent from the steering wheel 101.

In still other embodiments, the steering wheel audio control system 122 and the multifunction display control system 124 are part of a separate steering wheel zone 121, as depicted in FIG. 4. In such embodiments, the controller 304 causes the lighting elements associated with the interactive control elements 122a-e and 124a-e to increase in brightness based on signals received from a proximity detector.

More particularly, steering wheel 101 may include a steering wheel proximity detector 312. The steering wheel proximity detector 312 detects when a hand of the driver is approaching the interactive control elements 122a-e or 124a-e located on the steering wheel 101. The steering wheel proximity detector 312 is not shown in FIG. 1, but generally will be located in, on, or near the steering wheel 101. The steering wheel proximity detector 312 may be of any known type of proximity detector suitable for detecting the presence of human limbs, and generally will be a near field proximity detector. For example, the steering wheel proximity detector 312 may be an infrared proximity detector. In certain embodiments, the steering wheel proximity detector 312 may be configured to detect the presence of a hand when the hand is about three inches away from the interactive control elements 122a-e or 124a-e, but other distances are within the scope of the present disclosure.

In operation, the sensor system 305 may communicate to the controller 304 that one of the driver's hands is absent from the steering wheel 101. In addition, the steering wheel proximity detector 312 may communicate to the controller 304 that a hand of the driver is approaching the interactive control elements 122a-e or 124a-e located on the steering wheel 101. If the controller 304 receives these communications, the controller 304 will predict that the driver is reaching for one or more of interactive control elements 122a-e and 124a-e. The controller 304 will then cause lighting elements in the steering wheel zone 121 to increase in brightness. Later, the steering wheel proximity detector 312 may detect that the driver's hand is moving away from the interactive control elements 122a-e or 124a-e located on the steering wheel 101. The steering wheel proximity detector 312 will communicate this to the controller 304, which will cause the lighting elements in the steering wheel zone 121 to return to their initialized state (e.g., off or dimmed).

Although the above disclosure was with reference to a left-side zone 107, a right-side zone 113, and a steering wheel zone 121, other embodiments may not distinguish separate zones in this fashion. In some embodiments, all lighting elements within the vehicle cockpit 100 may increase in brightness when the driver removes either the driver's left hand or right hand from the steering wheel 101.

In certain embodiments, after the driver removes a left hand or right hand from the steering wheel 101 in order to reach for interactive control elements of interest, the driver's subsequent hand motions are used to refine the prediction regarding the interactive control elements the driver may intend to reach. In response to the refined prediction, the in-vehicle system 300 may further increase the brightness of lighting elements associated with interactive control elements that are subject of the refined prediction. To form refined predictions, the in-vehicle system may include proximity detectors 320, 321, 322, 323, 324, and 325 (depicted in FIG. 3 but not shown in FIG. 1) located in, on, or near respective electrical systems 108, 110, 112, 114, 116, and 118. The proximity sensors 320-325 are in electrical communication with the controller 304. As with the steering wheel proximity detector 312, the proximity detectors 320-325 may be any known type of proximity detector suitable for detecting the presence of human limbs, and generally will be a near field proximity detector. For example, the proximity detectors 320-325 may be infrared proximity detectors.

By way of example with reference to the infotainment system 114, a driver may remove his or her right hand from the steering wheel 101 and target the infotainment system 114. As previously explained, the controller 304 will cause lighting elements in the right-side zone 113 to increase in brightness. When the driver's right hand approaches closer to the interactive control elements 114a-h, the proximity detector 323 detects the presence of the driver's right hand. The proximity detector 323 sends an electrical signal to the controller 304 indicating a presence of a hand near the infotainment system 114. The controller 304 then causes the lighting elements associated with the interactive control elements 114a-h to increase in brightness a second time—i.e., causes the lighting elements to be even brighter than the already-brightened lighting elements located in the right-side zone 113. In this manner, the driver can more easily see the target interactive control elements 114a-h, and thus more easily select the specific interactive control element of interest.

When the driver moves the right hand away from the interactive control elements 114a-h, the proximity detector 323 sends an electrical signal to the controller 304 indicating this, upon which the controller 304 causes the lighting elements associated with the target interactive control elements 114a-h to return to their prior brightness level.

Although described in connection with the proximity detector 323 associated with the infotainment system 114, similar functionality can be provided for any of the proximity detectors 320-325 associated with any of the electrical systems 108, 110, 112, 114, 116, and 118.

In certain embodiments, the proximity detectors 320-325 are configured to send signals to the controller 304 indicating the presence of a driver's hand when the hand is approximately one foot away from a corresponding electrical system 108, 110, 112, 114, 116, or 118. However, other distances are within the scope of the present disclosure. In certain embodiments, the lighting elements in the left-side zone 107 or the right-side zone 113 are initially brought to a brightness corresponding to about 50% of their power capacity when the driver removes a left hand or right hand, respectively, from the steering wheel 101. Upon predicting a particular electrical system 108, 110, 112, 114, 116, or 118 for which the driver is reaching based on signals from the proximity detectors 320-325, lighting elements associated with that electrical system 108, 110, 112, 114, 116, or 118 are increased to a brightness corresponding to full power capacity. However, other relative brightness amounts are within the scope of the present disclosure.

In still other embodiments, upon identifying a particular electrical system 108, 110, 112, 114, 116, or 118 for which the driver is reaching based on signals from the proximity detectors 320-325, the lighting elements associated with that electrical system 108, 110, 112, 114, 116, or 118 are not further brightened. Instead, the brightness of other lighting elements that had previously been brightened based on a detected absence of the driver's left or right hand are dimmed or turned off.

FIG. 3 also shows a steering detector 310, which is used in certain embodiments to account for hand movements of the driver during steering operations. More particularly, the driver may remove his or her left or right hand from the steering wheel 101 not because the driver intends to reach for interactive control elements, but rather because the driver is grasping different locations of the steering wheel 101 to steer the vehicle. To account for this, the steering detector 310 determines whether the driver is engaged in a steering operation.

More particularly, a steering detector 310 detects the magnitude of rotation of the steering wheel 101 in either counterclockwise 136 or clockwise 138 directions. For example, the steering detector 101 depicted in FIG. 1 is shown in a nominal—i.e., generally straight-facing—orientation. The steering detector 310 detects the direction and magnitude of rotation of the steering wheel 101, converts the detected information into an electrical signal, and transmits the electrical signal to the controller 304.

The steering detector 310 may be part of a separate system of the vehicle related to the vehicle's steering functionality. For example, the vehicle may include a steer-by-wire system of which the steering detector 310 is a component. Thus, the in-vehicle system 300 may not require a separate, stand-alone steering detector 310 dedicated for use with the in-vehicle system 300.

In operation, the steering detector 310 determines whether the driver is engaged in a steering operation and, if so, communicates that information to the controller 304. The steering detector 310 may then periodically communicate follow-up indications of whether the driver is still engaged in a steering operation—e.g., every 100 milliseconds or other suitable time period. In the time period during which the driver is engaged in a steering operation, the controller 304 may be configured to ignore communications from the sensor system 305 regarding absences of the driver's left or right hands from the steering wheel 101. Instead, the controller 304 will assume that the driver is simply engaged in a steering operation rather than reaching for an interactive control element. Thus, the controller 304 will not cause lighting elements to increase in brightness upon a detected absence of the driver's left or right hand from the steering wheel 101 during steering operations.

When the driver concludes a steering operation, the steering detector 310 detects that the steering wheel 101 has returned to a nominal position. The steering detector 310 communicates this information to the controller 304, which then ceases ignoring and once again processes signals from the sensor system 305.

In other embodiments, the controller 304 will continue to cause lighting elements to increase in brightness during steering operations, but takes into account information about the steering operation in selecting which lighting elements should increase in brightness. Specifically, the steering wheel 101 may include additional sensors 140a-140g on the steering wheel 101. As explained, the steering detector 310 may transmit information regarding a magnitude of rotation of the steering wheel 101 to the controller 304. Based on the magnitude of rotation, the controller 304 determines expected locations for the driver's left and right hands on the steering wheel 101. For example, if the driver is engaged in a sustained turn in which the steering wheel 101 is rotated approximately 30° in the clockwise direction 138, the controller 304 will determine an expected location near the sensor 140a for the driver's left hand and an expected location near the sensor 140g for the driver's right hand.

The controller 304 may then communicate to the sensor system 305 that it seeks information regarding a presence or an absence of the driver's left hand at sensor 140a, and information regarding a presence or an absence of the driver's right hand at sensor 140g. The sensor system 305 will transmit the requested information to the controller 304. If the sensor system 305 indicates that the driver's left hand is absent from the sensor 140a, the controller will predict that the driver is engaged in a steering operation during which the driver is reaching for interactive control elements on the left side of the driver. In response, the controller 304 will cause lighting elements in the left-side zone 107 to increase in brightness. Similarly, if the sensor system 305 indicates that the driver's right hand is absent from the sensor 140g, the controller will predict that the driver is engaged in a steering operation during which the driver is reaching for interactive control elements on a right side of the driver. In response, the controller will cause lighting elements in the right-side zone 107 to increase in brightness.

In the embodiments described above, lighting elements were brightened or dimmed based on actions taken by the driver. However, lighting elements may also be brightened or dimmed based on actions by a passenger. More particularly, the vehicle cockpit 100 may include a passenger motion detector 330 (depicted in FIG. 3 but not shown in FIG. 1) that detects motion of a passenger sitting in either the front passenger seat or a rear seat of the vehicle. The passenger motion detector 330 may be a proximity sensor or, alternatively, may operate based on camera detection. In certain embodiments, the passenger motion detector 330 can detect when a passenger moves his or her arms a predetermined distance away from his or her body. The specific predetermined distance can be tailored to a desired sensor sensitivity or based on dimensions of a given vehicle cockpit 100. In certain embodiments, the predetermined distance is about 10 inches or 25.5 centimeters.

The passenger motion detector 330 is in electrical communication with the controller 304, and signals to the controller 304 when a passenger moves his or her arms by more than the predetermined distance. In response, the controller 304 causes an increase in brightness of one or more lighting elements. In certain embodiments, the controller 304 causes an increase in brightness of lighting elements in the right-side zone 113 and/or other lighting elements associated within interactive control elements within reach of the passenger.

The controller 304 may be provided on one or more modules, but in certain embodiments, is provided as an embedded, integrated microcontroller or system-on-a-chip. Embedded implementations are useful for in-vehicle systems because they provide high speed computational power within a portable module without the need for communication with external computers. Generally, the controller 304 will include a processor 306 and a memory 308. Software implementing the logic by which the controller 304 functions may be written in program code using a variety of languages, but in certain embodiments is written in a programming language that is suitable for compilation to and execution on microcontrollers, such as the C programming language or assembly programming languages. After compilation of the program code, the compiled, executable program instructions may be stored to the memory 308, from which they can be read and processed at run-time by the processor 306.

Figure 5:
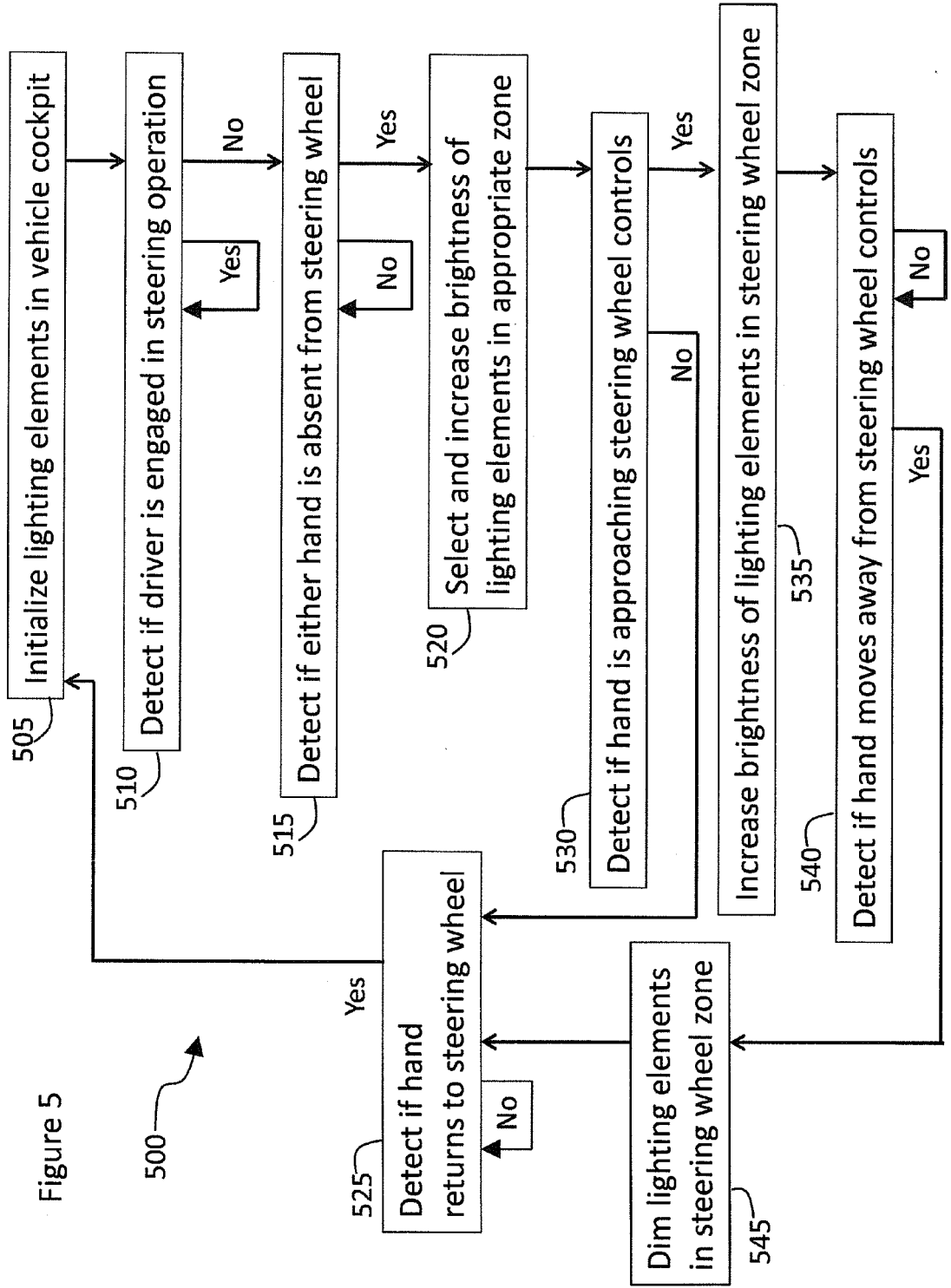
FIG. 5 is a flow diagram of an exemplary method of controlling the brightness of lighting elements associated with interactive control elements in accordance with the disclosure.

FIG. 5 is a flow diagram of an exemplary method 500 by which an in-vehicle system controls the brightness of lighting elements associated with interactive control elements in accordance with the disclosure. In certain embodiments, the method 500 is implemented by program code stored in a memory and configured to execute on a processor during operation of the vehicle. At 505, the in-vehicle system initializes lighting elements in the vehicle cockpit to an off-state or a dimmed state, as explained above. At 510, the in-vehicle system 300 detects if the driver is engaged in a steering operation. If so, the in-vehicle system may ignore indications that a driver's hand is absent from the steering wheel and continue detecting if the driver is still engaged in a steering operation.

If the vehicle is not engaged in a steering operation or is no longer engaged in a steering operation, the in-vehicle system controller proceeds to 515, in which it detects if either the driver's left hand or right hand is absent from the steering wheel. If both hands are present on the steering wheel, the in-vehicle system returns to 510. If one of the hands is absent, at 520, the in-vehicle system selects and increases the brightness of lighting elements in a zone corresponding to the hand that is absent from the steering wheel—i.e., the left-side zone in the case of the left hand, or the right-side zone in the case of the right hand.

Next, at 530, the in-vehicle system detects if the hand absent from the steering wheel is approaching interactive control elements on the steering wheel, such as those associated with the audio control system or the multifunction display control system. If so, at 535, the in-vehicle system increases the brightness of lighting elements in the steering wheel zone. The in-vehicle system then proceeds to determine, at 540, if the hand is later moved away from interactive control elements on the steering wheel. If the hand is moved away from interactive control elements on the steering wheel, at 545, the in-vehicle system will dim the lighting elements in the steering wheel zone to their initialized state (e.g., dimmed or off).

If the hand did not approach interactive control elements on the steering wheel, or if the hand approached but then was moved away from interactive control elements on the steering wheel, the in-vehicle system proceeds to 525. At 525, the in-vehicle system detects if the hand has returned to the steering wheel. If not, the in-vehicle system continues monitoring whether the hand returns to the steering wheel. If and when the hand returns to the steering wheel, the in-vehicle system returns to its initialized state at 505, in which all lighting elements are dimmed or off.

As explained above, electrical systems accessible to drivers and passengers in vehicle cockpits have become increasingly complex. A driver in a modern vehicle cockpit may be able to control numerous electrical systems including electrical systems for climate control, for controlling windows, infotainment, navigation, and for mobile communication, to name a few. These electrical systems provide useful features for drivers and passengers and make the driving experience more enjoyable and efficient. However, monitoring and controlling these electrical systems can distract the driver from the driver's primary task—to drive the vehicle.

To control conventional electrical systems such as those identified above, a driver must reach for interactive control elements, such as buttons, knobs, or dials, and then manipulate the interactive control elements. Electrical systems have become so numerous in a modern vehicle cockpit that it usually requires attention from the driver to first locate and then reach for the interactive control elements associated with any given electrical system. Even after the driver has successfully located and reached towards the relevant interactive control elements, the driver must find the particular interactive control element—e.g., the specific button, knob, or dial—that is of interest. The interactive control elements are often small, making them difficult to locate, particularly where the driver is simultaneously paying attention to his or her driving. This problem is made worse during night-time driving conditions, when there may be limited visibility in the interior of the vehicle cockpit.

Embodiments of the present disclosure provide a solution to the technical problem of providing effective control of distractions provided by conventional electrical systems that are a distraction to the driver. In one disclosed solution, a sensor is provided that detects a presence or an absence of a left hand of a driver on a steering wheel of the vehicle and a sensor that detects a presence or an absence of a right hand of the driver on the steering wheel of the vehicle. With the data from these sensors, one or more interactive control elements may be predicted with which the driver will interact based upon a detection that either the driver's left hand or the driver's right hand is absent from the steering wheel. Thus, embodiments may further provide a controller that increases the brightness of lighting elements associated with the interactive control elements with which the driver is predicted to interact.

Further, embodiments of the present disclosure provide a solution to that technical problem by providing systems, components, and methodologies comprise a controller having a processor and a memory, a sensor system in communication with the controller, various electrical systems having interactive control elements with which a driver may interact, and lighting elements in communication with the controller and associated with respective interactive control elements.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. An in-vehicle system for controlling electrical systems of a vehicle, comprising:
a sensor that detects a presence or an absence of a left hand of a driver on a steering wheel of the vehicle;
a sensor that detects a presence or an absence of a right hand of the driver on the steering wheel of the vehicle;
a controller that predicts one or more interactive control elements with which the driver will interact based on either a detected absence of the driver left hand on the steering wheel or a detected absence of the driver right hand on the steering wheel,
the controller selects, based on the prediction, the predicted one or more interactive control elements and
increases a brightness of lighting elements associated with the selected one or more interactive control elements.

2. The in-vehicle system of claim 1, wherein the controller:
selects a first interactive control element on a left side of the driver based on the detected absence of the driver left hand on the steering wheel, and
selects a second interactive control element on a right side of the driver based on the detected absence of the driver right hand on the steering wheel.

3. The in-vehicle system of claim 1, further comprising:
a detector that detects whether either the driver left hand or the driver right hand is approaching a target interactive control element,
wherein the target interactive control element is one of the selected interactive control elements, and
wherein the controller increases the brightness of the target interactive control element a second time upon a detection that either the driver left hand or the driver right hand is approaching the target interactive control element.

4. The in-vehicle system of claim 1, further comprising:
a sensor that detects whether either the driver left hand or the driver right hand is approaching interactive control elements located on the steering wheel, and
wherein the controller increases a brightness of lighting elements associated with the interactive control elements located on the steering wheel in response to a detection that either the driver left hand or the driver right hand is approaching the interactive control elements located on the steering wheel.

5. The in-vehicle system of claim 1, wherein the controller is configured to ignore position changes of the driver left hand and the driver right hand resulting from driver steering operations.

6. The in-vehicle system of claim 1, further comprising:
at least one sensor that detects movements of a passenger, and
wherein the controller selects, based on a prediction, one or more interactive control elements with which the passenger will interact.

7. A method for controlling electrical systems of a vehicle, comprising:
detecting a presence or an absence of a driver hand on a steering wheel of the vehicle;
predicting one or more interactive control elements with which the driver will interact and select based upon the detection of the presence or the absence of the driver hand on the steering wheel; and
increasing a brightness of lighting elements associated with the selected one or more interactive control elements,
wherein the selection of the one or more interactive control elements is based on a detected absence of the driver hand on the steering wheel.

8. The method of claim 7, further comprising:
detecting a presence or an absence of a driver right hand on the steering wheel of the vehicle;
detecting a presence or an absence of a driver left hand on the steering wheel of the vehicle; and
selecting the one or more interactive control elements based on either a detected absence of the driver left hand on the steering wheel or a detected absence of the driver right hand on the steering wheel.

9. The method of claim 8, further comprising:
selecting an interactive control element on a left side of the driver upon the detected absence of the driver left hand on the steering wheel; and
selecting an interactive control element on a right side of the driver upon the detected absence of the driver right hand on the steering wheel.

10. The method of claim 7, further comprising:
detecting that the driver hand is approaching a target interactive control element among the selected interactive control elements; and
increasing the brightness of a lighting element associated with the target interactive control element a second time.

11. The method of claim 7, further comprising:
detecting that the driver hand is approaching interactive control elements located on the steering wheel; and
increasing a brightness of lighting elements associated with the interactive control elements located on the steering wheel.

12. The method of claim 7, further comprising:
detecting that the driver is engaged in a steering operation; and
ignoring position changes of the driver hand resulting from driver steering operations.

13. The method of claim 7, further comprising:
detecting that the driver is engaged in a steering operation;
identifying a location on the steering wheel based on a magnitude of rotation of the steering wheel during the steering operation;
detecting a presence or an absence of the driver hand at the identified location on the steering wheel of the vehicle during the steering operation; and
selecting the one or more interactive control elements with which the driver will interact based on a detected absence of the hand of the driver at the identified location of the steering wheel.

14. An in-vehicle system for use in a vehicle having interactive control elements accessible to a driver of the vehicle, the system comprising:
- a sensor located on a steering wheel of the vehicle;
- respective lighting elements associated with the one or more interactive control elements;
- a processor in electrical communication with the sensor and the respective lighting elements;
- a non-transitory data storage device on which is stored computer code which, when executed on the processor, causes the in-vehicle system to:
  - detect a presence or an absence of a driver hand on the steering wheel of the vehicle;
  - select, based upon a prediction, one or more of the interactive control elements with which the driver will interact in response to a detected absence of the driver hand on the steering wheel; and
  - cause the lighting elements associated with the selected interactive control elements to increase in brightness.

15. The in-vehicle system of claim 14, wherein the sensor has a spatial resolution of longer than about one inch.

16. The in-vehicle system of claim 14, further comprising:
- a first sensor located at a first position of the steering wheel corresponding to an expected location of a driver right hand, and
- a second sensor located at a second position of the steering wheel corresponding to an expected location of a driver left hand.

17. The in-vehicle system of claim 16, wherein the first sensor and the second sensor are regions of a common touch-sensitive surface.

18. The in-vehicle system of claim 16, wherein the first sensor and the second sensor are capacitive sensors.

19. The in-vehicle system of claim 18, wherein the first sensor and the second sensor are resistive sensors.

20. The in-vehicle system of claim 18, wherein the steering wheel includes additional sensors at locations corresponding to expected locations of the hands of the driver during steering operations.

21. The in-vehicle system of claim 14, wherein the computer code, when executed on the processor, causes the in-vehicle system to:
- select an interactive control element on a left side of the driver upon a detection that a driver left hand is absent from the steering wheel; and
- select an interactive control element on a right side of the driver upon a detection that a driver right hand is absent from the steering wheel.

22. The in-vehicle system of claim 14, further comprising:
- a proximity detector associated with a target one of the selected interactive control elements and in electrical communication with the processor,
- wherein the computer code, when executed on the processor, causes the in-vehicle system to
  - detect that the driver hand is approaching the target one of the selected interactive control elements; and
  - in response to the detection that the driver hand is approaching the target one of the selected interactive control elements, increase the brightness of a lighting element associated with the target interactive control element a second time.

23. The in-vehicle system of claim 14, further comprising a proximity detector associated with the steering wheel and in electrical communication with the processor, wherein
- the computer code, when executed on the processor, causes the in-vehicle system to:
  - detect that the driver hand is approaching the steering wheel; and
  - in response to the detection that the driver hand is approaching the steering wheel, increase the brightness of lighting elements associated with the interactive control elements located on the steering wheel.

24. The in-vehicle system of claim 14 further comprising a module in communication with the processor for detecting a magnitude of a rotation of a steering wheel during a steering operation.

25. The in-vehicle system of claim 14, further comprising means for detecting a movement of a passenger.

* * * * *